US010362551B2

(12) United States Patent
Cai et al.

(10) Patent No.: US 10,362,551 B2
(45) Date of Patent: Jul. 23, 2019

(54) CALIBRATION METHOD FOR PARALLEL MULTI-CHANNEL WIRELESS CHANNEL MEASUREMENT AND SYSTEM FOR THE SAME

(71) Applicant: SHANGHAI RESEARCH CENTER FOR WIRELESS COMMUNICATIONS, Shanghai (CN)

(72) Inventors: Zhong-fei Cai, Shanghai (CN); Yun-song Gui, Shanghai (CN); Hao-wen Wang, Shanghai (CN); Ming-tuo Zhou, Shanghai (CN); Yang Yang, Shanghai (CN); Hai-feng Wang, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 6 days.

(21) Appl. No.: 15/669,931

(22) Filed: Aug. 6, 2017

(65) Prior Publication Data
US 2018/0288723 A1   Oct. 4, 2018

(30) Foreign Application Priority Data

Apr. 2, 2017  (CN) .......................... 2017 1 0215261

(51) Int. Cl.
*H04W 56/00*  (2009.01)
*H04J 13/18*  (2011.01)
(Continued)

(52) U.S. Cl.
CPC .......... *H04W 56/0065* (2013.01); *H04B 1/69* (2013.01); *H04B 17/0085* (2013.01);
(Continued)

(58) Field of Classification Search
CPC ............ H04W 56/001; H04W 56/0065; H04B 17/21; H04B 17/0085; H04B 17/14; H04B 17/30; H04J 13/18; H04J 2013/0096
See application file for complete search history.

(56) References Cited

U.S. PATENT DOCUMENTS 8,477,866 B2   7/2013 Lee
8,750,151 B2 * 6/2014 Wallace ............... H04B 7/0421
370/208

(Continued)

*Primary Examiner* — Brian D Nguyen
(74) *Attorney, Agent, or Firm* — Soroker Agmon Nordman

(57) ABSTRACT

The present invention discloses a calibration method for parallel multi-channel wireless channel measurement and a calibration system thereof. The transmitting end and the receiving end are disconnected, and are respectively connected to the calibration receiving channel and the calibration transmitting channel, and the calibration receiving channel/calibration transmitting channel cooperates with a measurement channel in air interface measurement, to calibrate a channel response characteristic of the transmitting end and the receiving end. By means of the present invention, a current channel response characteristic between multiple channels can be online supervised in real time, so as to ensure that a measurement error because of an impact of mutual interference between multiple channels can be avoided in the channel measurement process.

9 Claims, 9 Drawing Sheets

(51) Int. Cl.
  *H04B 17/00* (2015.01)
  *H04B 17/14* (2015.01)
  *H04B 17/21* (2015.01)
  *H04B 1/69* (2011.01)
  *H04J 13/00* (2011.01)
  *H04B 17/30* (2015.01)

(52) U.S. Cl.
  CPC ............ *H04B 17/14* (2015.01); *H04B 17/21* (2015.01); *H04J 13/18* (2013.01); *H04W 56/001* (2013.01); *H04B 17/30* (2015.01); *H04J 2013/0096* (2013.01)

(56) References Cited

U.S. PATENT DOCUMENTS

| | | | | |
|---|---|---|---|---|
| 2004/0085939 A1* | 5/2004 | Wallace | | H04B 7/0421 370/335 |
| 2004/0157646 A1* | 8/2004 | Raleigh | | H01Q 3/2605 455/562.1 |
| 2005/0128953 A1* | 6/2005 | Wallace | | H04B 7/0421 370/241 |
| 2007/0086536 A1* | 4/2007 | Ketchum | | H04B 7/0413 375/260 |
| 2010/0087227 A1* | 4/2010 | Francos | | H03F 1/3247 455/562.1 |
| 2012/0166894 A1* | 6/2012 | Jang | | G11C 29/02 714/700 |
| 2012/0176928 A1* | 7/2012 | Wallace | | H04B 7/0421 370/252 |
| 2012/0220331 A1* | 8/2012 | Luo | | H04B 17/14 455/517 |
| 2014/0242914 A1* | 8/2014 | Monroe | | H04B 17/11 455/63.4 |
| 2017/0318623 A1* | 11/2017 | Duffy | | H04W 36/14 |

* cited by examiner

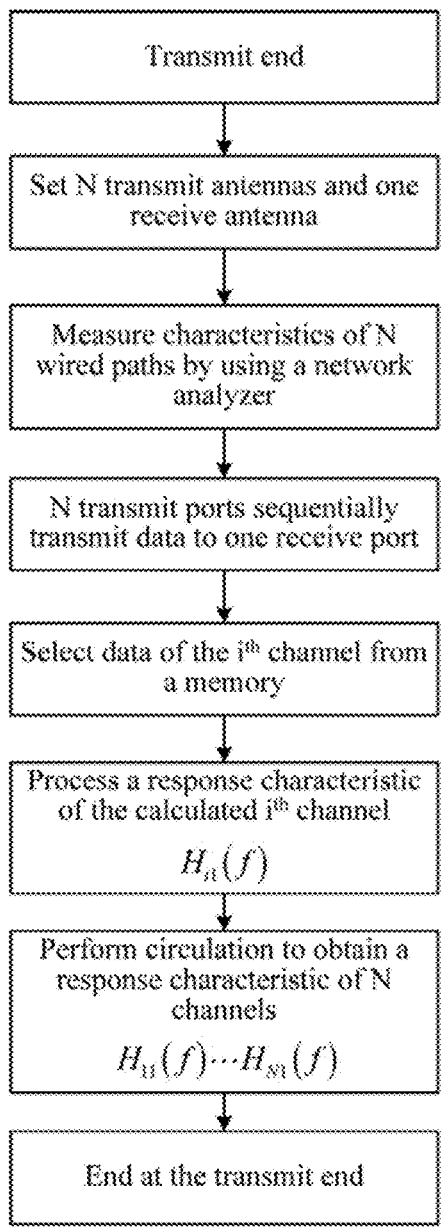
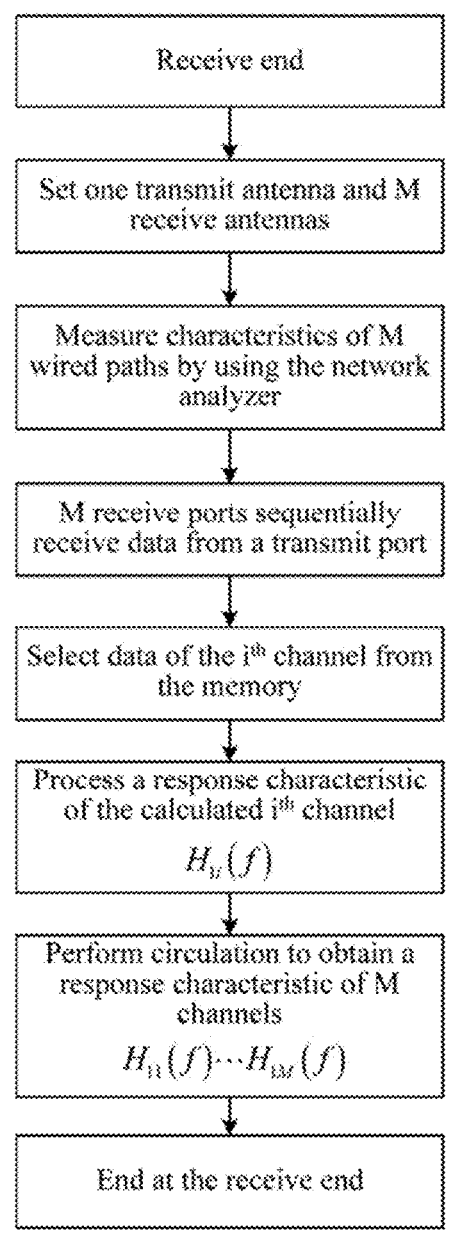
FIG. 2
FIG. 3

CALIBRATION METHOD FOR PARALLEL MULTI-CHANNEL WIRELESS CHANNEL MEASUREMENT AND SYSTEM FOR THE SAME

BACKGROUND

Technical Field

The present invention relates to a calibration method for parallel multi-channel wireless channel measurement, and also to a calibration system for implementing the calibration method, and belongs to the field of wireless communications test technologies.

Related Art

In a conventional communications test technology, a calibration solution for a parallel multi-channel wireless channel is basically evolved from a calibration solution in a single-channel scenario. In the calibration solution, multi-channel switching is implemented in dependence on a multiplexing switch to implement multi-channel calibration and measurement, and only one channel is measured at a same moment, and therefore the calibration solution is essentially a measurement and calibration solution based on time division. In the calibration solution, measurement signals do not need to be orthogonal to each other. Therefore, the structure is relatively simple, and system implementation costs are relatively low. Additionally, a quantity of antennas at a receive/transmitting end may flexibly switch. However, the calibration solution imposes a quite strict control requirement on synchronous switching of the receiving end and the transmitting end, and generally relates to a relatively long measurement time, and consequently is not suitable for a high-speed movement scenario.

FIG. 1 shows a connection block diagram in which in an example the foregoing calibration solution, a receive/transmitting end having 8 antenna ports is connected to an 8×1 multiplexer switch module. Either of the receiving end and the transmitting end is provided with an end-connected 8×1 multiplexer switch module used for calibration. A transmit antenna and a receive antenna are selected from transmit antennas (TX1, TX2, . . . , TX8) and receive antennas (RX 1, RX 2, . . . , RX 8) by using the 8×1 multiplexer switch module, a frequency response calibration result between the transmit antenna and the receive antenna is obtained, and the multiplexing switch is switched to obtain a frequency response matrix H(f).

On the other hand, in a MIMO (multiple-input multiple-output) technology, signals can be respectively and independently sent by using multiple antennas of the transmitting end, and moreover multiple antennas are used at the receiving end to receive and restore original information, thereby exponentially improving the throughput, the transfer distance and the frequency spectrum utilization of the communications system without increasing the bandwidth. Parallel measurement on a multi-channel wireless channel by use of the MIMO technology has a quicker measurement speed, and is particularly suitable for a high-speed movement scenario.

Ideally, switches of the receiving end and the transmitting end can be switched at the same time. However, in an actual operation process, an error always exists between switching of the switches of the receiving end and the transmitting end, the measurement error is caused because of clock jitters of the receiving end and the transmitting end, and a larger quantity of switching times of the switches indicates a larger introduced clock jitter error. In U.S. Pat. No. 8,477,866 B2, it is put forward that after each channel response is measured, a response characteristic between each pair of channels is calculated by using a relative characteristic response between neighboring channels, thereby calibrating each pair of channels. An algorithm used in this invention is simply described as follows:

First, a path from N transmit channels to M measurement channels is linked, and a channel response characteristic S of a passive device on the path is measured by using a vector network analyzer:

$$S(f) = \begin{bmatrix} s_{12}(f) & & & & & & & s_{1M}(f) \\ & s_{22}(f) & & & & & & \\ & & s_{33}(f) & & & & & \\ & & & s_{44}(f) & & & & \\ & & & & s_{55}(f) & & & \\ & & & & & s_{66}(f) & & \\ & & & & & & \ddots & \\ s_{N1}(f) & & & & & & & s_{NM}(f) \end{bmatrix}$$

Secondly, a calibration and measurement process is divided into two parts for a transmitting end and a receiving end, only one receiving channel is needed when channel responses of N transmit channels are measured, these N transmit channels transmit data in a time division manner, and the receiving channel sequentially receives the data of the N transmit channels; only one transmitting channel is needed when channel responses of M receive channels are measured, the receive channels sequentially receive data sent by this transmit channel, and a specific process is shown in FIG. 2 and FIG. 3.

Finally, by using the N transmitting channel responses $H_{i1}(f) \ldots H_{N1}(f)$ and the M receiving channel responses $H_{i1}(f) \ldots H_{1M}(f)$, a channel response matrix $H(f)_{N \times M}$ of the N transmit channels and the M receive channels is calculated. If a channel response from the $i^{th}$ transmitting channel to the j receiving channel is $H_{ij}(f)$, $$H_{ij}(f) = H_{ij}(f) = H_{11}(f) \cdot \frac{H_{ij}}{H_{11}} i = 1, \ldots, N; j = 1, \ldots, M$$

By using the foregoing formula, if a calibration response keeps constant in the measurement process, the response matrix $H(f)_{N \times M}$ for calibrating the channel response is obtained through calculation in subsequent measurement, to complete calibration.

It may be seen from the calibration process of the transmitting end and the receiving end that, if the quantity of antenna ports increases, the foregoing algorithm can greatly reduce a quantity of switching times of the switches, and 64 groups of TX/RX channel response characteristics may be obtained by reducing original 64 times of switching to only 16 times of switching, so as to greatly reduce the quantity of switching times of the switches, and alleviate a clock jitter problem caused because of repetitive switching. However, the foregoing algorithm does not radically resolve a time jitter problem caused by switching of the switches, and a clock jitter error still exists during measurement.

Practices prove that, calibration for parallel multi-channel wireless channel measurement not only needs to consider a channel response characteristic of a one-to-one receive/ transmit channel, but also needs to consider a channel response error introduced by multiple actual cases such as a signal interference between multiple channels, a clock phase jitter, and a device time delay. Additionally, even if multiplex testing signals transmitted in parallel use an orthogonal sequence, the testing signals still interfere with each other because of different time delays at the receiving end, and calibration precision is affected.

SUMMARY

Accordingly, the present invention is directed to a calibration method for parallel multi-channel wireless channel measurement.

The present invention is further directed to a calibration system for implementing the foregoing calibration method.

To achieve the above objectives, the present invention adopts the following technical solution.

According to a first aspect of embodiments of the present invention, a calibration method for parallel multi-channel wireless channel measurement is provided, where a calibration receiving channel is added at a transmitting end and a calibration transmitting channel is added at a receiving end, and the method comprising the following steps:

disconnecting the transmitting end and the receiving end, connecting the transmitting end with the calibration receiving channel, connecting the receiving end with the calibration transmitting channel, and recording channel response characteristic of the transmitting end and the receiving end with cooperation of the calibration receiving channel and the calibration transmitting channel in air interface measurement.

Preferably, in the calibration process, the transmitting end parallel transmits multi-channel data, and the receiving end parallel receives multi-channel data in a code division multiplexing manner.

Preferably, the receiving end acquires a peak value by using a correlation between orthogonal sequences, and transforms the peak value to a frequency domain by using FFT, to measure a frequency response matrix of channels.

Preferably, the receiving end selects the $j^{th}$ receive channel, generates a local sequence of an $i^{th}$ transmitting channel of the transmitting end, performs a correlation operation on a receiving sequence of the $j^{th}$ receiving channel and the local sequence of the $i^{th}$ transmitting channel to acquire the correlation peak value, wherein both i and j are positive integers;

then transforms the correlation peak value to the frequency domain by using FFT, to acquire a frequency domain channel response characteristic; and acquires channel responses of all channels as the frequency response matrix.

Preferably, calibrating the channel response characteristic of the transmitting end and the receiving end with a measurement transmitting channel and a measurement receiving channel, when the measurement transmitting channel in a silent period, the calibration transmitting channel transmits a narrow pulse signal for circularly testing, and transmission of the narrow pulse signal satisfies a time delay requirement of the measurement transmitting channel and the measurement receive channel.

Preferably, when the transmitting end transmits a signal, the calibration transmitting channel is closed; after transmission of the signal, the calibration transmitting channel begins to transmit the narrow pulse signal.

Preferably, at the transmitting end and the receiving end, a pulse per second is used as an initial synchronization trigger signal source; and a periodic trigger signal is generated with the initial synchronization trigger signal used as a reference signal, and is then transmitted to the transmitting channels and the receiving channels.

Preferably, before the step of disconnecting the transmitting end and the receiving end, directly connecting the transmitting end and the receiving end, disconnecting the calibration receiving channel and the calibration transmitting channel, and testing a response characteristic of a passive device.

According to a second aspect of the embodiments of the present invention, a calibration system for parallel multi-channel wireless channel measurement is provided, where the calibration system comprises:

a transmitting end including a combiner and a calibration receiving channel, the calibration receiving channel selectively connecting to an output end of the combiner; and a receiving end including a splitter and a calibration transmitting channel, the calibration transmitting channel selectively connecting to an input end of the splitter.

Preferably, the transmitting end further includes a plurality of splitters, whose output ends connect with an input end of the combiner at the transmitting end;

the receiving end further includes a plurality of combiners, whose input ends connect to an output end of the splitter at the receiving end.

Preferably, the calibration receiving channel connects to the output end of the combiner at the transmitting end and the calibration transmitting channel connects to the input end of the splitter at the receiving end, in a condition that the transmitting end disconnect with the receiving end.

Preferably, the calibration receiving channel disconnects to the output end of the combiner at the transmitting end and the calibration transmitting channel disconnects to the input end of the splitter at the receiving end, in a condition that the transmitting end connects with the receiving end.

Compared with the prior art, in the present invention, multi-channel data is transmitted in parallel and received in parallel at a same moment, thereby better satisfying a channel measurement requirement in a high-speed scenario while shortening a calibration time. Moreover, a calibration transmitting channel and a calibration receiving channel are added at a receiving end and a transmitting end respectively, so that a channel response characteristic between multiple channels can be supervised at a current moment in real time and online, so as to ensure that a measurement error caused because of an impact of mutual interference between multiple channels can be avoided in a channel measurement process.

BRIEF DESCRIPTION OF THE DRAWINGS

The present disclosure will become more fully understood from the detailed description given herein below for illustration only, and therefore are not limitative of the present disclosure, and wherein:

FIG. 2 is a flowchart showing that a transmitting end performs channel calibration by using a neighboring channel relationship in the prior art;

FIG. 3 is a flowchart showing that a receiving end performs channel calibration by using a neighboring channel relationship in the prior art;

DETAILED DESCRIPTION

Technical content of the present invention is described in detail below with reference to accompanying drawings and specific embodiments.

Figure 1:
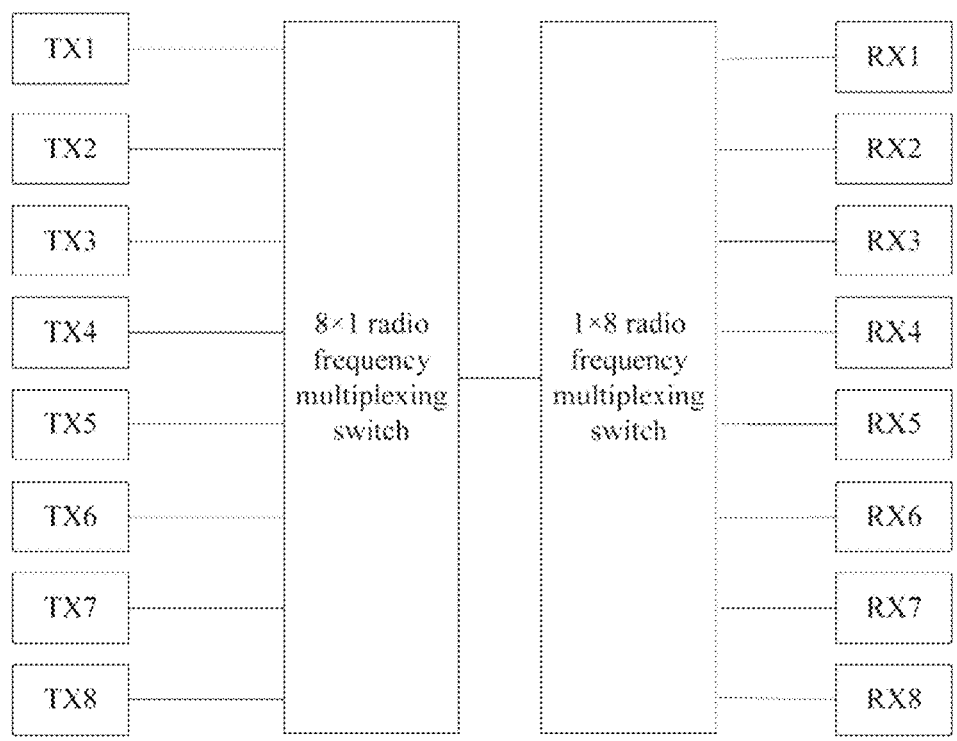
FIG. 1 is a schematic diagram of a calibration solution for a parallel multi-channel wireless channel in the prior art.
Figure 4:
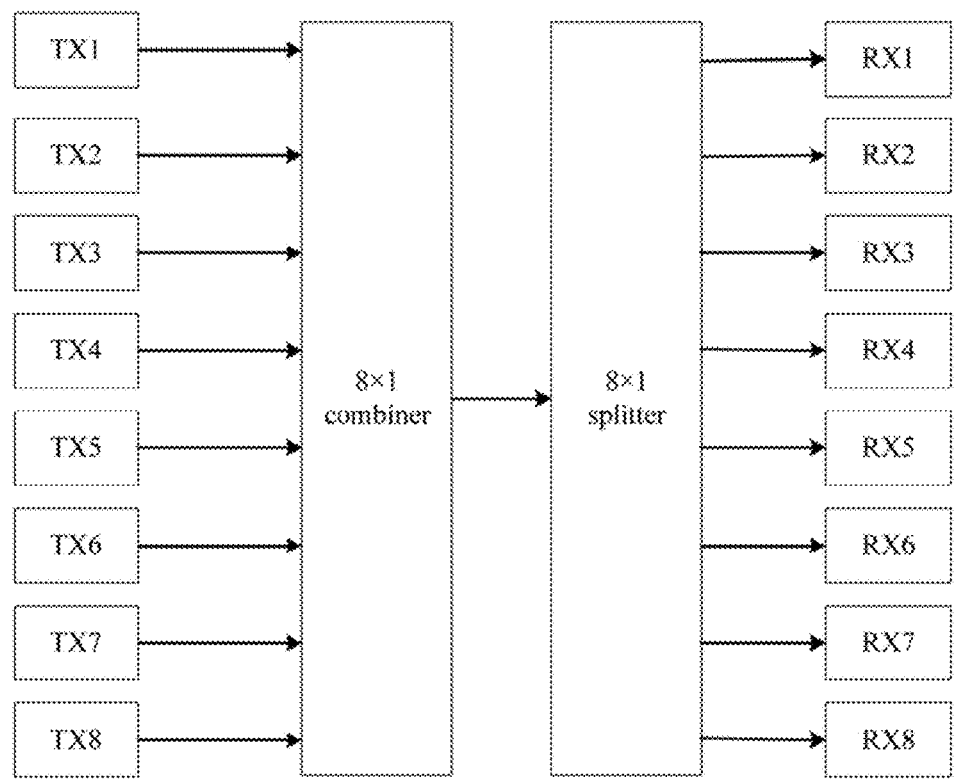
FIG. 4 is a block diagram showing that eight antenna ports transmit/receive data in parallel according to an embodiment of the present invention.

FIG. 4 is a block diagram showing that eight antenna ports transmit/receive data in parallel according to an embodiment of the present invention. Antennas TX1 through TX8 transmit data simultaneously, and antennas RX 1, RX 2 . . . RX 8 simultaneously receives the data transmitted by TX1 through TX8. In this way, it is not needed to repetitively switch, and a frequency response matrix of transmitting channels and receiving channels could be simultaneously acquired by transmitting once. Compared with a conventional calibration method, calibration data is simultaneously transmitted and received without switching in the present invention, so as to resolve a time jitter problem caused by frequently switching and thus improve measurement precision.

On the other hand, measurement error is inevitable to some extent. Multi-channel concurrent testing signals interfere with each other. But, the channel interference in the measurement process cannot be obtained because the interference such as a phase jitter is time-varying for clock asynchronization and non-idealization of radio frequency device. Therefore, it is necessary to supervise the measurement error in real time.

To implement a real-time supervision function, it is meaningful to resolve a time-varying response correlation between parallel multi-channels caused by the asynchronization between the radio frequency device and the clock, so as to obtain a channel response difference between N transmitting channels or N receiving channels in the measurement process. Therefore, a calibration receiving channel is added at a transmitting end and a calibration transmitting channel is added at the receiving end in the present invention. By using these two calibration channels to record channel responses of N transmitting channels and N receiving channels at the current moment, a channel response relationship between TX2 through TX8 and TX1 and a channel response relationship between RX 2 through RX 8 and RX 1 can be calculated. In data post processing, the measurement error caused by the multi-channels responses is eliminated. This is described in detail below with reference to a specific embodiment.

Figure 5:
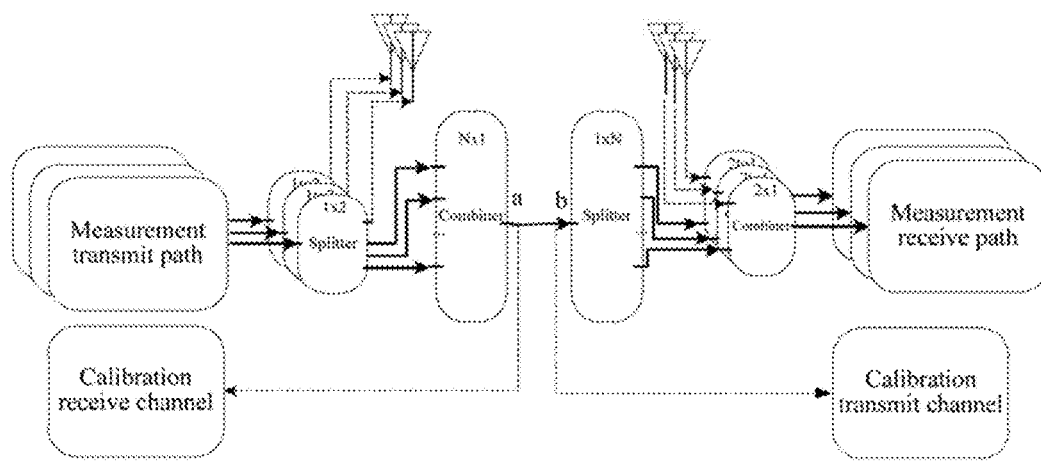
FIG. 5 is a logic block diagram of a calibration method for parallel multi-channel wireless channel measurement according to the present invention.

FIG. 5 is a logic block diagram of a calibration method for wireless parallel multi-channel measurement according to the present invention. In the present calibration method, a traditional time division multiplexing switch is not used. Instead, a calibration receiving channel is added at the transmitting end and a calibration transmitting channel is added at the receiving end, for online supervising a channel response characteristic between multiple channels at a current moment in real time. Thus, it ensures that a measurement error caused by interference between multiple channels can be avoided in the channel measurement process.

In the embodiment shown in FIG. 5, a plurality of 1×2 splitters and a calibration receiving channel are added at the transmitting end, and a plurality of 2×1 combiners and a calibration transmitting channel are added at the receiving end. A main function of the 1×2 splitter in the measurement process is to simultaneously split a transmitting signal into two signals and respectively transmit the two signals to an antenna port and the calibration receiving channel. A main function of the 2×1 combiner is to ensure during measurement that the receiving end can receive a measurement signal that is output by the antenna port and a calibration measurement signal that is output by the calibration transmitting channel. These two calibration channels implements real-time supervising channel response characteristics of the transmitting end and the receiving end.

Considering that in an actual measurement process, the transmitting channel and the receiving channel of a measurement signal locate far away, a conventional solution in which the transmitting end and the receiving end are directly connected by using a radio frequency cable is not used. Instead, a method for adding calibration channels is used in the present invention to implement real-time supervision and calibration, so as to ensure that the calibration would not affected by a physical distance. Output signals of the transmitting channels (that is, the transmitting end) pass through a plurality of 1×2 splitters and then are fed into an N×1 combiner. The output end (point a in FIG. 5) of the N×1 combiner is connected to the input end (point b in FIG. 5) of a 1×N splitter. Output ends of the 1×N splitter are connected to input ends of a plurality of 2×1 combiners, and output ends of the 2×1 combiners are connected to the receiving channels (that is, the receiving end). The calibration receiving channel is led out from the output end of the N×1 combiner (point a in FIG. 5), and the calibration transmitting channel is led out from the input end of the 1×N splitter (point b in FIG. 5).

Figure 6:
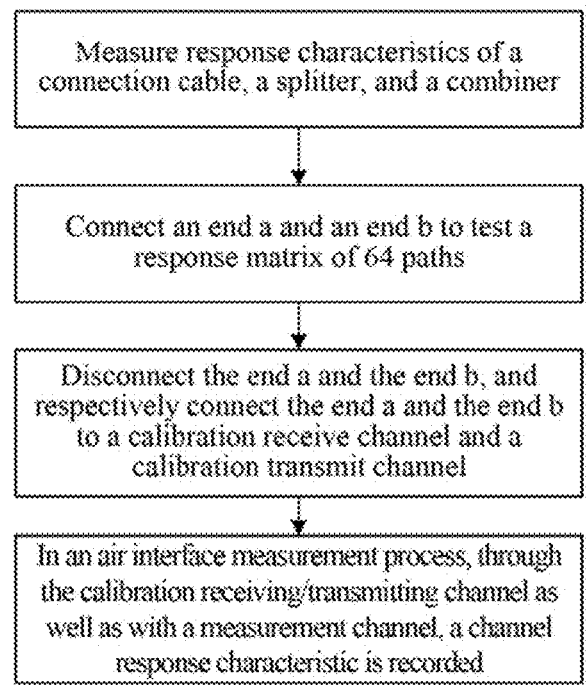
FIG. 6 is a flowchart of the calibration method for parallel multi-channel wireless channel measurement according to the present invention.

FIG. 6 is a flowchart of the calibration method for wireless parallel multi-channel measurement according to the present invention. In the calibration process, the point a and the point b are directly connected by using a radio frequency cable, the calibration receiving channel and the calibration transmitting channel are disconnected, and a response characteristic of passive devices (for example, a connection cable, a splitter and a combiner) is tested, to obtain a calibration channel response matrix $H(f)_{8\times 8}$. In an air interface measurement process, the point a and the point b, without connecting each other, are respectively connected to the calibration receiving channel and the calibration transmit channel. Through the calibration receiving channel and the calibration transmitting channel as well as with a measurement channel, a channel response characteristic of the transmitting end and the receiving end is recorded to be calibrated. A specific description is as follows:

First, a frequency response characteristic of the added passive device is measured by using a vector network analyzer (VNA). In the embodiment shown in FIG. 7 (A), a frequency response of the passive device from eight transmit paths to eight receive paths is marked as S(f):

$$S(f) = \begin{bmatrix} S_{11}(f) & & & & S_{18}(f) \\ & S_{22}(f) & & & \\ & & S_{33}(f) & & \\ & & & \ddots & \\ S_{81}(f) & & & & S_{88}(f) \end{bmatrix}$$

Figure 7A:
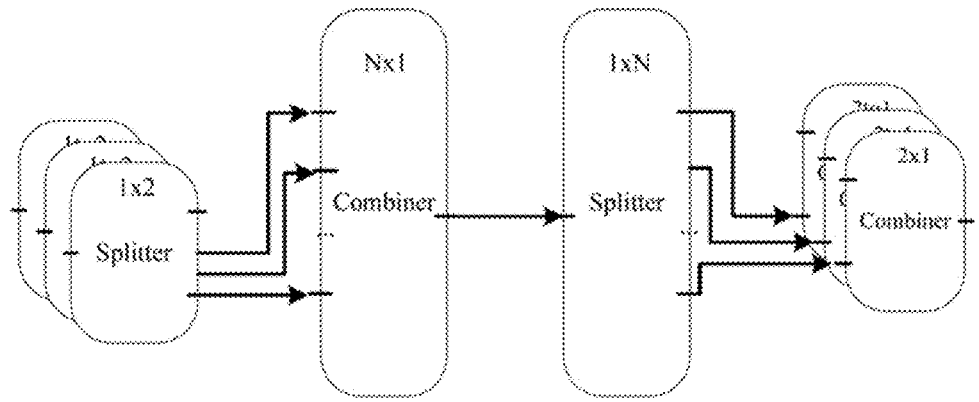
FIG. 7(A) to FIG. 7(C) are schematic diagrams of a connection relationship between eight transmit paths to eight receive paths according to the present invention.
Figure 7B:
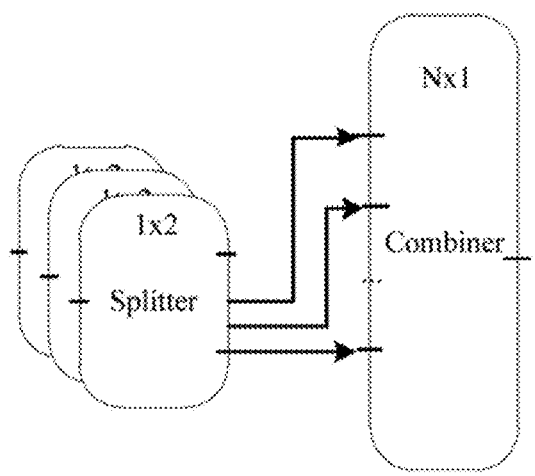
Figure 7C:
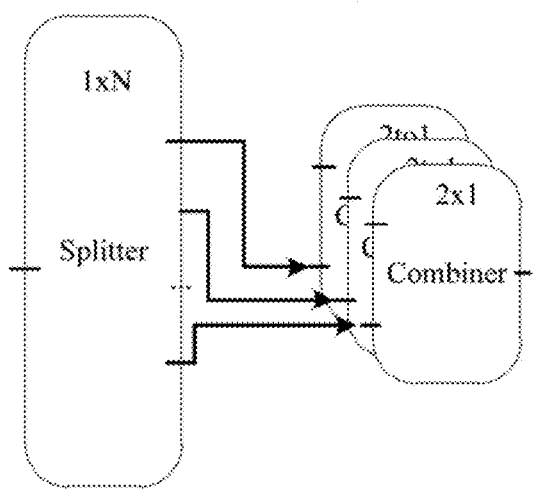

In the embodiment shown in FIG. 7 (B), a frequency response characteristic from eight transmit paths to the calibration receiving channel is marked as S'(f):

$$S'(f) = [S'_{11}(f) S'_{21}(f) \ldots S'_{81}(f)]$$

In the embodiment shown in FIG. 7 (C), a frequency response from the calibration transmitting channel to eight receive paths is marked as S"(f):

$$S''(f) = [S''_{11}(f) S''_{12}(f) \ldots S''_{18}(f)]$$

Secondly, at a calibration moment $t_0$, the transmitting end and the receiving end are connected, and the calibration transmitting channel and the calibration receiving channel are closed. The transmitting end simultaneously transmits eight RF signals, and the receiving end processes to obtain 8 groups of signal sequences orthogonal to each other. Then, in subsequent processing, a frequency response characteristic of a measurement device itself is $H^{t_0}(f)$, where $H^{t_0}(f)$ is an 8×8 matrix:

$$H^{t_0}(f) = \begin{bmatrix} H_{11}^{t_0}(f) & \ldots & H_{18}^{t_0}(f) \\ \vdots & \ddots & \vdots \\ H_{81}^{t_0}(f) & \ldots & H_{88}^{t_0}(f) \end{bmatrix}$$

$H_{ij}(f)$ denotes a channel response from the $i^{th}$ transmit port to the $j^{th}$ receive port, and $S_q(f)$ denotes a response characteristic of a combiner and a splitter through which the signal passes. Therefore, there is:

$$H_{ij}^{t_0}(f) = H_{TXi}^{t_0}(f) \cdot S_{ij}(f) \cdot H_{RXj}^{t_0}(f)$$

$$i = 1, \ldots, 8; \quad j = 1, \ldots, 8$$

Finally, at a measurement moment $t_1$, the radio frequency cable between the transmitting end and the receiving end is disconnected, a signal from the transmitting end of the N channels passes through a splitter, and turns to 2 signals. One of the signals passes via an antenna port to the receiving end, and the other passes through an 8×1 combiner to the calibration receiving channel. In this way, at the same time of measuring the channel response of an air interface from the transmitting end to the receiving end, a time-varying response result of N measurement channels between the receiving end and the transmitting end may be tested by using the calibration receiving channel/calibration transmitting channel. Thus, the calibration receiving channel processes and acquires a time-varying channel response of the N transmitting channels. A calibration response of the $i^{th}$ transmitting channel is denoted by $H_{i_{TX}}^{t_1}(f)$:

$$H_{i_{TX}}^{t_1}(f) = H_{TXi}^{t_1}(f) \cdot S_{i1}'(f) \cdot H_{mtRX}^{t_1}(f) \quad i = 1, \ldots, 8$$

The receiving end receives via the antennas radio frequency data sent by the transmitting end. In a silent period of the transmitting end, the receiving end receives a circular testing signal sent by the calibration transmitting channel through the 1×8 combiner. After the receiving end processes the signal sent by the calibration transmitting channel, a time-varying channel response of the N receiving channels may be calculated, and a calibration response of the $j^{th}$ receiving channel is denoted by $H_{j_{RX}}^{t_1}(f)$:

$$H_{j_{RX}}^{t_1}(f) = H_{asTX}^{t_1}(f) \cdot S_{1j}''(f) \cdot H_{RXj}^{t_1}(f) \quad j = 1, \ldots, 8$$

It may be seen from the foregoing formula that, a calibration response may be a product of a transmit response, a receive response, and a frequency response of a passive device. Furthermore, a relationship between the transmit channels may be obtained by a ratio of the calibration responses of the second through the eighth transmitting channels to the calibration response of the first transmitting channel:

$$\frac{H_{i_{TX}}^{t_1}}{H_{1_{TX}}^{t_1}}(f) = \frac{H_{TXi}^{t_1}(f) \cdot S_{i1}'(f) \cdot H_{calRX}^{t_1}(f)}{H_{TX1}^{t_1}(f) \cdot S_{11}'(f) \cdot H_{calRX}^{t_1}(f)} = \frac{H_{TXi}^{t_1}(f) S_{i1}'(f)}{H_{TX1}^{t_1}(f) S_{11}'(f)}$$

$$i = 2, \ldots, 8$$

Likewise, a relationship between receiving channels may be obtained by a ratio of the calibration response of the second through the eighth receiving channels to the calibration response of the first receiving channel:

$$\frac{H_{j_{RX}}^{t_1}}{H_{1_{RX}}^{t_1}}(f) = \frac{H_{calTX}^{t_1}(f) \cdot S_{1j}''(f) \cdot H_{RXj}^{t_1}(f)}{H_{calTX}^{t_1}(f) \cdot S_{11}''(f) \cdot H_{RX1}^{t_1}(f)} = \frac{H_{RXj}^{t_1}(f) S_{1j}''(f)}{H_{RX1}^{t_1}(f) S_{11}''(f)}$$

$$j = 2, \ldots, 8$$

Based on a hypothesis that the channel response of the first receiving channel and the first transmitting channel is kept unchanged at the measurement time and calibration time, that is, $H_{11}^{t_0}(f) = H_{11}^{t_1}(f)$, the calibration response can be calculated by the following formula:

$$H_{ij}^{t_1}(f) = H_{11}^{t_0}(f) \cdot \frac{H_{i_{TX}}^{t_1}}{H_{1_{TX}}^{t_1}}(f) \cdot \frac{H_{j_{RX}}^{t_1}}{H_{1_{RX}}^{t_1}}(f)$$

Figure 8:
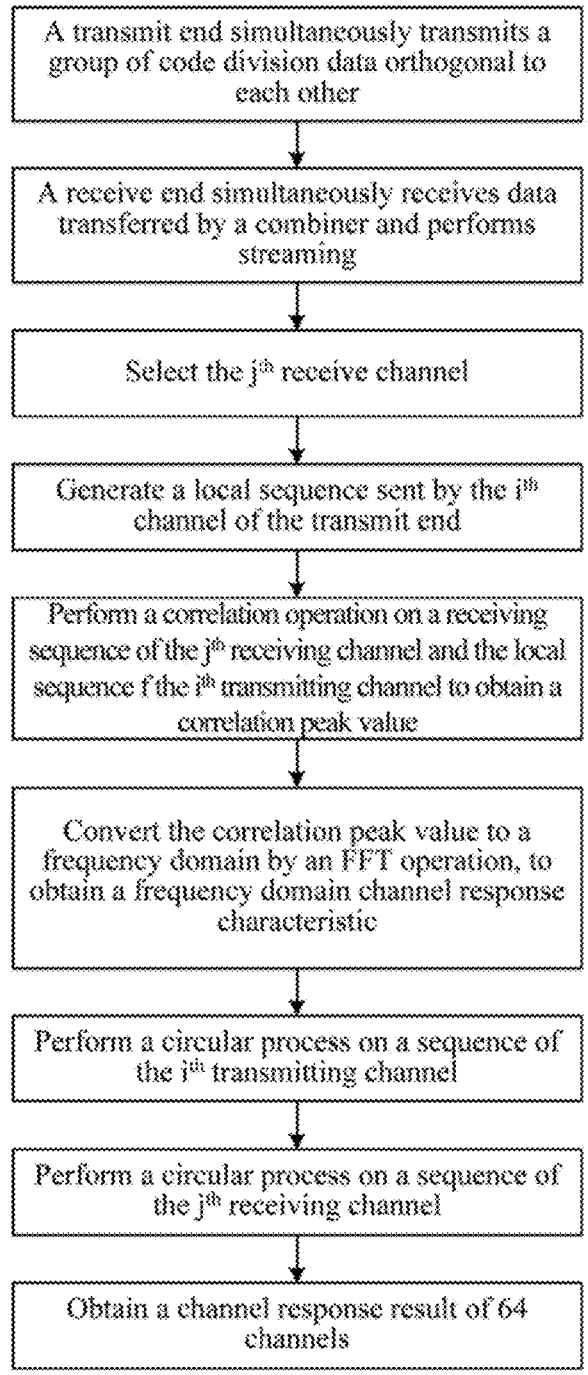
FIG. 8 is a flowchart of calculating and calibrating a channel frequency response according to the present invention.

In an embodiment of the present invention, a process of calculating and calibrating the channel frequency response is shown in FIG. 8. The transmitting end/receiving end transmits/receives concurrent multi-channel data in a code division multiplexing manner, and the transmitting ports/receiving ports are individually distinguished by using a group of orthogonal sequences orthogonal to each other. After receiving data, the calibration transmitting channel and the calibration receiving channel perform subsequent processing. In detail, when a response result of a channel is processed in a receiving process, depending on data amount and hardware performance, it is selective to simultaneously perform streaming (that is, consecutively transmitting data from a memory or transmitting data to a memory) and processing or to perform processing after the streaming. In the subsequent processing, the receiving end receives data transferred by a combiner and performs streaming simultaneously. Then, the receiving end selects the $j^{th}$ receive channel, generates a local sequence sent by the $i^{th}$ channel of the transmitting end, and performs a correlation operation on a receiving sequence of the $j^{th}$ channel and the local sequence of the $i^{th}$ channel to obtain a correlation peak value. Subsequently, the receiving end converts the correlation peak value to a frequency domain by using an FFT operation, to obtain a frequency domain channel response characteristic. Accordingly, the sequence of the $i^{th}$ transmitting channel is circularly processed, and the $j^{th}$ receiving channel is circularly processed, so as to obtain a channel response result of 64 channels, where both i and j are positive integers. After acquiring the peak value by using the correlation of the orthogonal sequences, the receiving end converts the peak value to the frequency domain by using FFT, thereby measuring the frequency response matrix of the channels.

$$H(f) = \begin{bmatrix} H_{11}(f) & \cdots & H_{18}(f) \\ \vdots & \ddots & \vdots \\ H_{81}(f) & \cdots & H_{88}(f) \end{bmatrix}$$

Figure 9:
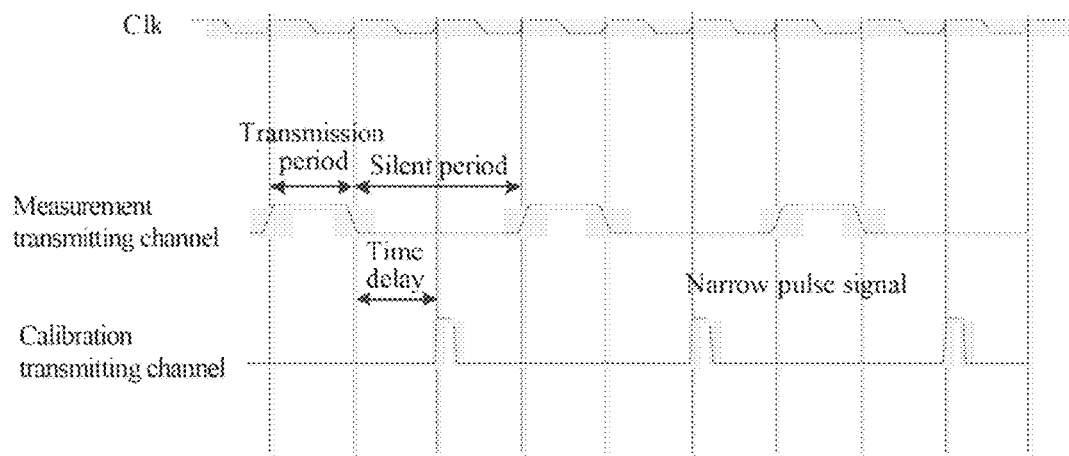
FIG. 9 is a diagram of an operating time sequence between a measurement transmitting channel and a calibration transmitting channel according to the present invention.

To ensure that the receiving end can correctly receive a signal, a time point at which the calibration transmitting channel transmits data needs to be distinguished from a time point at which the measurement transmitting channel transmits data. In an embodiment of the present invention, when the measurement transmitting channel is in a silent period, the calibration transmitting channel transmits a narrow pulse signal for circularly testing. Moreover, transmission of the narrow pulse signal needs to satisfy a time delay requirement of the measurement transmitting channel and the measurement receiving channel, so as to ensure that aliasing does not occur between a PN (pseudo random noise) sequence received by the receiving end and the narrow pulse. When the transmitting end transmits a signal (for example, a PN sequence), the calibration transmitting channel is closed; after transmission of the signal is ended, the calibration transmitting channel begins to transmit the narrow pulse signal. An illustrative time sequence diagram is shown in FIG. 9.

Additionally, it is necessary to realized strict synchronization between transmitting channels, between receiving channels, and between the receiving channels and the transmitting channels. At first, in the present invention, a GPS receiver (or Beidou terminal) is used at either of the receiving end and the transmitting end. The OPS receiver (or Beidou terminal) is used to provide a 1 pps (pulse per second) as an initial synchronization trigger signal source. Secondly, the initial synchronization trigger signal is used as a reference signal, and transmitted to an AWG (arbitrary waveform generator) at the receiving end or the transmitting end to generate a periodic trigger signal. The periodic trigger signal is transmitted by using a PXI (PCI extensions for instrumentation) bus, and transmitted to the transmitting or receiving channels, to trigger signal transmission of an FPGA. Additionally, clocks at the receiving end and the transmitting end need to be strictly synchronous in period and phase. Therefore, in the present invention, two rubidium clocks are separately used at the receiving end and the transmitting end. The two rubidium clocks are aligned for a period of time, phase jitters of the two rubidium clocks can be controlled at a level of p seconds. 10 Mhz reference signals from the clocks are transmitted to the receiving end and the transmitting end, and channel reference clocks at the receiving end and the transmitting end share these two 10 Mhz reference signals, thereby precisely synchronizing clocks of the receiving channels and the transmitting channels.

Figure 10A:
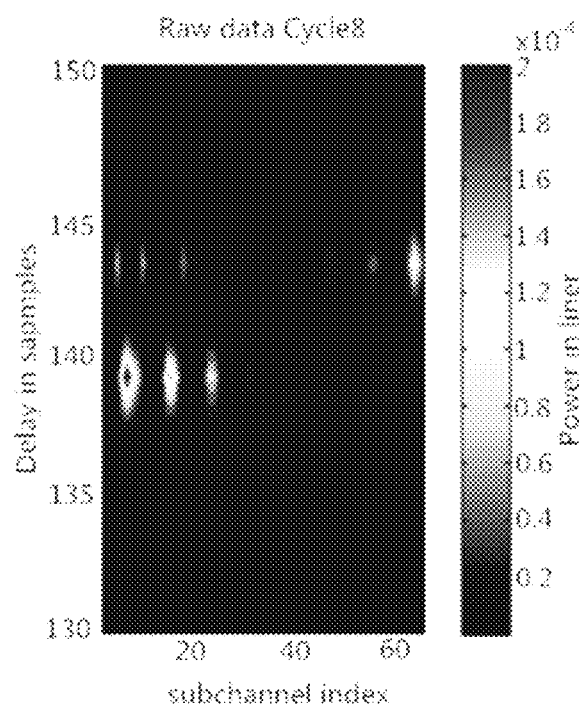
FIG. 10 (A) to FIG. 10 (C) are respectively schematic diagrams of pairwise multi-path time delay power spectrum of 64 groups of receive/transmit antenna pairs in cases of using raw data, using calibration data, and using calibration data compensation.
Figure 10B:
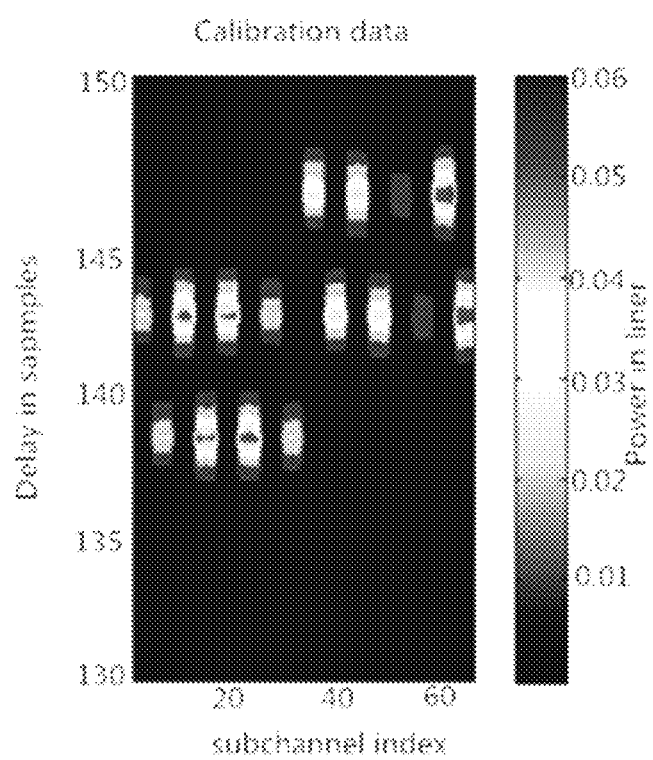
Figure 10C:
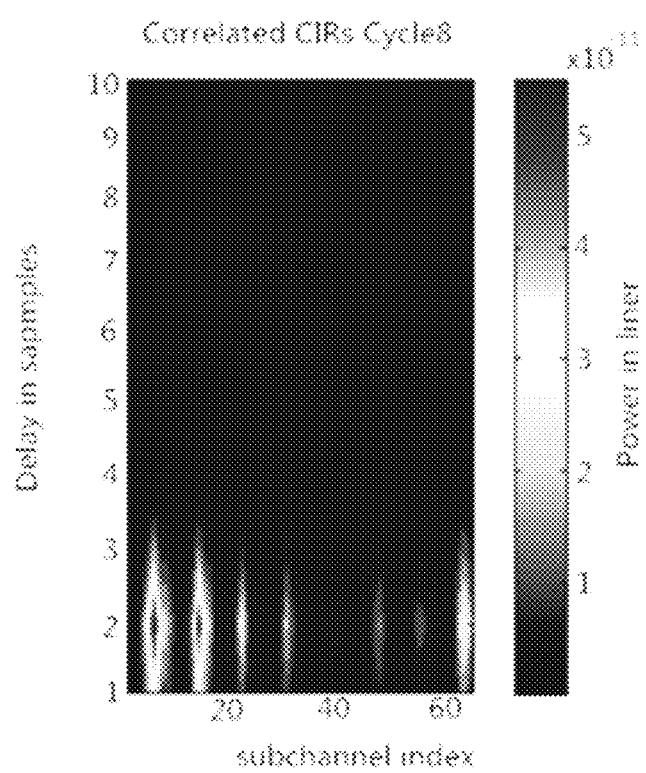

FIG. 10 (A) to FIG. 10 (C) respectively show pairwise multi-path time delay power spectrum of 64 groups of receive/transmit antenna pairs in cases of using raw data, calibration data, and calibration data compensation. Impacts of a wireless measurement channel and an RF radio frequency response on a time delay power spectrum may be seen from an image of raw data. The calibration data also has a time delay power spectrum same as that of the raw data, and it may be seen from a calibrated pattern that all power spectrums are already aligned. It indicates that at a post-processing stage, the calibration data effectively compensates for a response difference of an RF channel, and a time delay of these 64 groups of data decreases from 3.0277 ns (before calibration) to 0.048 ns (after calibration).

Compared with the prior art, in the calibration method for parallel multi-channel wireless channel measurement and the system for the same provided in the present invention, without a conventional time division multiplexing switch, multi-channel data is transmitted and received parallel and concurrently. Thereby, the present invention better satisfies a channel measurement requirement in a high-speed scenario while shortening a calibration time. Moreover, the calibration transmitting channel and the calibration receiving channel are respectively added at the receiving end and the transmitting end, so that the current channel response characteristic between multiple channels can be on-line supervised in real time, so as to ensure that a measurement error caused by an impact of mutual interference between the multiple channels can be avoided in the channel measurement process. In the measurement process, response results between channels at the transmitting end and the receiving end may be separately obtained, thereby eliminating a time-varying correlation between the radio frequency channels to more precisely measure the response result of the wireless channel.

The calibration method for parallel multi-channel wireless channel measurement and the system for the same provided in the present invention are described in detail above. Any apparent modification made to the present invention by persons of ordinary skill in the art without departing from the essence of the present invention constitutes violation on patent rights of the present invention, and the persons should bear corresponding legal liabilities.

What is claimed is:

1. A calibration method for parallel multi-channel wireless channel measurement, wherein a calibration receiving channel is added at a transmitting end and a calibration transmitting channel is added at a receiving end, and the method comprising the following steps:
   disconnecting the transmitting end and the receiving end, connecting the transmitting end with the calibration receiving channel,
   connecting the receiving end with the calibration transmitting channel, and
   recording channel response characteristic of the transmitting end and the receiving end with cooperation of the calibration receiving channel and the calibration transmitting channel in air interface measurement, the receiving end acquires a peak value by using a correlation between orthogonal sequences, and transforms the peak value to a frequency domain by using FFT, to measure a frequency response matrix of channels.

2. The calibration method according to claim 1, wherein:
in a calibration process, the transmitting end parallel transmits multi-channel data, and the receiving end parallel receives multi-channel data in a code division multiplexing manner.

3. The calibration method according to claim 2, further comprising,
Before the step of disconnecting the transmitting end and the receiving end, directly connecting the transmitting end and the receiving end, disconnecting the calibration receiving channel and the calibration transmitting channel, and testing a response characteristic of a passive device.

4. The calibration method according to claim 1, wherein:
the receiving end selects a $j^{th}$ receiving channel, generates a local sequence of an $i^{th}$ transmitting channel of the transmitting end, performs a correlation operation on a receiving sequence of the $j^{th}$ receiving channel and the local sequence of the $i^{th}$ transmitting channel to acquire the correlation peak value, wherein both i and j are positive integers;
then transforms the correlation peak value to the frequency domain by using FFT, to acquire a frequency domain channel response characteristic; and
acquires channel responses of all channels as the frequency response matrix.

5. The calibration method according to claim 1, wherein:
calibrating the channel response characteristic of the transmitting end and the receiving end with a measurement transmitting channel and a measurement receiving channel,
when the measurement transmitting channel in a silent period, the calibration transmitting channel transmits a narrow pulse signal for circularly testing, and
transmission of the narrow pulse signal satisfies a time delay requirement of the measurement transmitting channel and the measurement receiving channel.

6. The calibration method according to claim 5, wherein:
when the transmitting end transmits a signal, the calibration transmitting channel is closed; after transmission of the signal, the calibration transmitting channel begins to transmit the narrow pulse signal.

7. The calibration method according to claim 1, wherein:
at the transmitting end and the receiving end, a pulse per second is used as an initial synchronization trigger signal source; and
a periodic trigger signal is generated with the initial synchronization trigger signal used as a reference signal, and is then transmitted to the calibration transmitting channels and the calibration receiving channels.

8. A calibration system for parallel multi-channel wireless channel measurement comprising:
a transmitting end including a combiner and a calibration receiving channel, the calibration receiving channel selectively connecting to an output end of the combiner; and
a receiving end including a splitter and a calibration transmitting channel, the calibration transmitting channel selectively connecting to an input end of the splitter,
in a condition that the transmitting end disconnect with the receiving end, the calibration receiving channel connects to the output end of the combiner at the transmitting end and the calibration transmitting channel connects to the input end of the splitter at the receiving end;
in a condition that the transmitting end connects with the receiving end, the calibration receiving channel disconnects to the output end of the combiner at the transmitting end and the calibration transmitting channel disconnects to the input end of the splitter at the receiving end.

9. The calibration system according to claim 8, wherein:
the transmitting end further includes a plurality of splitters, whose output ends connect with an input end of the combiner at the transmitting end;
the receiving end further includes a plurality of combiners, whose input ends connect to an output end of the splitter at the receiving end.

* * * * *